United States Patent [19]

Albrecht et al.

[11] Patent Number: 4,655,485
[45] Date of Patent: Apr. 7, 1987

[54] SEALS FOR USE IN OIL AND GAS WELL PRODUCTION TUBING

[75] Inventors: Norman M. Albrecht, Huffman, Tex.; Roy J. Blanchard, Sr., Houma, La.

[73] Assignee: Tube-Alloy Corporation, Houma, La.

[21] Appl. No.: 831,050

[22] Filed: Feb. 18, 1986

Related U.S. Application Data

[63] Continuation of Ser. No. 563,936, Dec. 20, 1983, abandoned.

[51] Int. Cl.[4] .............................................. A16L 25/00
[52] U.S. Cl. .................................... 285/333; 285/350; 285/910
[58] Field of Search ............... 285/333, 334, 349, 350, 285/230, 231, DIG. 910

[56] References Cited

U.S. PATENT DOCUMENTS

| | | | |
|---|---|---|---|
| 874,652 | 12/1907 | Bailey | 285/DIG. 910 |
| 2,246,436 | 6/1941 | Downey | 285/349 X |
| 2,383,692 | 8/1945 | Smith | 285/349 X |
| 2,980,451 | 4/1961 | Taylor et al. | 285/333 X |

FOREIGN PATENT DOCUMENTS 1942335  3/1971  Fed. Rep. of Germany ...... 285/231
532883  2/1958  Italy ..................................... 285/333

Primary Examiner—Dave W. Arola
Attorney, Agent, or Firm—Llewellyn A. Proctor

[57] ABSTRACT

An improved seal for use in couplings, and joints, as used in the formation of production tubing. Such seal is located in an inwardly tapered threaded section of the coupling, or joint, and it is characterized generally as an annular groove and ring-shaped extrudable generally non-resilient sealing member seated in said groove, said ring-member being extrudable into and confinable within said groove when said couplings, or joints, are made up by threadably connecting therewith a threaded end of pipe. The bottom face of said groove, in particular, is contoured sufficiently that a portion of the distorted ring-shaped sealing member is displaced therein to reduce the amount of pressure normally applied against the wall and, in its most preferred embodiment, the annular groove is provided with side walls, and interconnected angular sides cut into the threaded portion of the coupling, or joint.

5 Claims, 6 Drawing Figures

SEALS FOR USE IN OIL AND GAS WELL PRODUCTION TUBING

This is a continuation of co-pending application Ser No. 563,936 filed on Dec. 20, 1983, now abandoned.

FIELD OF THE INVENTION

This invention relates to new and improved seals for use in production tubing, as employed in the Oil and Gas Industry.

BACKGROUND AND PRIOR ART

In the production of oil and gas a well bore is formed which extends downwardly from the earth's surface. The well bore is formed by cutting into the earth's surface with a rotary bit attached to a drill string formed from joints of pipe sequentially attached as the well bore is extended downwardly. A drilling mud is circulated through the hollow drill string, jetted through and across the face of the drill bit, and then passed upwardly through the well bore as the well is drilled. Eventually, at some predetermined depth, the drill string is tripped out of the surface hole, a casing string is run and cemented in place and drilling is resumed until a producing stratum is reached which tests show is economically feasible for completion of the well. Casing is set, a production tubing constituted of couplings and interconnected sections of pipe, or joints of pipe, is run downwardly from the earth's surface to the producing stratum, the well is brought in, and oil and gas flow from the producing stratum through the production tubing to the earth's surface.

The average depth to which oil and gas wells are drilled increases from year to year, as does the hostility of the environment in which the wells are set. Bottom hole temperatures and pressures are quite high, and increase with increasing depths. The acidity, and corrosiveness of this environment is one to which production tubing is constantly exposed and must continuously function in delivering oil and gas to the earth's surface.

In U.S. Pat. No. 2,980,451, which issued Apr. 18, 1961 to William B. Taylor and Wilbur H. Griffin, there is described an improvement in sealing production tubing which has admirably served the oil and gas industry for many years. The couplings and interconnected sections of pipe, or joints of pipe, which constitute the Taylor-Griffin production tubing are provided with seals in the couplings and joints which prevent leakage in wells where enormous pressures are encountered. The seals are formed within the coupling members, and joints, by providing lateral circumferential flat bottomed, straight side walled grooves which are cut within a threaded inside wall of the coupling members, and joints, within which are mounted seal rings, or packing rings constituted of a generally non-resilient extrudable material. The externally threaded male members, when the coupling members, and joints, are made up, compress, deform and extrude to some extent the rings within their retaining grooves to form an effective leak-proof seal. However, albeit production tubing formed by the coupling members, and joints, in such manner have been effectively sealed, the seals have contributed to the corrosiveness of production tubing. Examination and study of production tubing sealed in this manner has shown considerable corrosion on the outside walls of the coupling members, and joints, opposite the sealing areas.

OBJECTS

It is, accordingly, the primary objective of the present invention to provide new and improved seals for use in the formation of production tubing; seals which effectively seal coupling members and interconnected sections of pipe, and joints, but which simultaneously cause less corrosion.

A specific object of this invention is to provide effective leak-proof seals capable of withstanding enormous pressures when coupling members and joints are made up, capable of use in corrosive atmospheres for longer periods than the now more conventional seals.

THE INVENTION

These objects and others are achieved in accordance with the present invention embodying improvements in seals used in couplings, and joints, as used in the formation of production tubing. In such a tubular member containing an inwardly tapered threaded section provided with a seal inclusive of an annular groove and ring-shaped extrudable generally non-resilient sealing member seated in said groove, said ring-member being extrudable into and confinable within said groove when said couplings, or joints, are made up by threadably connecting therewith a threaded end of pipe, the improvement wherein the bottom face of said annular groove component of said seal is contoured sufficiently that a portion of the distorted ring-shaped sealing member is displaced therein this reducing the amount of pressure normally applied against the wall. The bottom face of said annular groove in couplings, or joints, is contoured to provide a radius ranging from about $\frac{1}{8}$ inch to about $\frac{1}{4}$ inch, preferably from about 1/16 inch to about 5/16 inch. The width of the annular groove generally ranges from about 0.1 inch to about 0.75 inch, more often from about 0.25 inch to about 0.50 inches.

In its most preferred embodiment, the annular groove is provided with side walls, the side walls of the annular groove are straight and are adjoined to angular sides ranging from about 20° to about 45°, preferably from about 25° to about 35°.

This invention, and its principle of operation, will be more fully understood by reference to the following detailed description of a preferred embodiment, and to the accompanying drawing to which reference is made in the description. In the drawing, similar numbers represent similar parts, or components, in the several views. In the drawing and description, where subscripts are used with numbers, the latter is to be taken in generic sense, the subscripts being used to indicate that the unit referred to is constituted of more than one part, or component.

Figure 1:
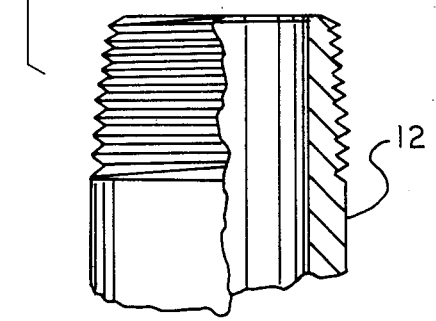
FIG. 1 depicts in partial section a coupling, and portions of interconnected pipe sections, within the inner threaded side wall of which is provided a pair of seals, one located at the upper end of the coupling and the other at the lower end of the coupling, each of these seals being formed of a grooved component and ring component.
Figure 2:
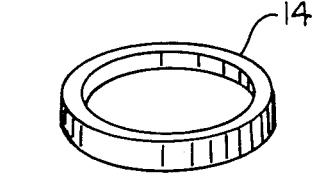
FIG. 2 depicts in perspective a ring component of a seal.
Figure 4:
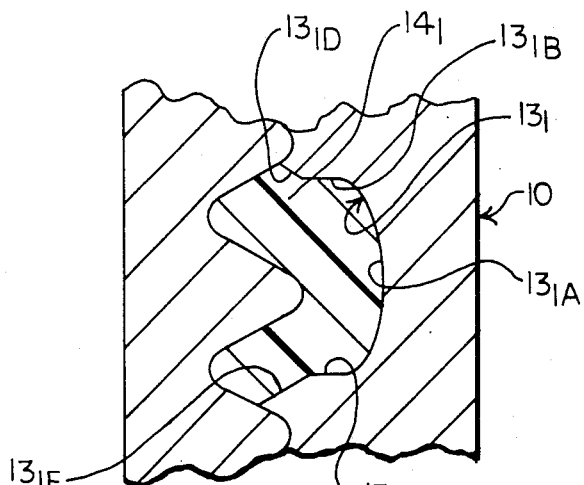
FIG. 4 depicts, in fragmentary section, an enlargement of a seal cross-section of the coupling, inclusive of a grooved component and seal ring component, in which the coupling and pipe section is made up.

Referring to the figures, initially to FIG. 1, there is shown an internally threaded coupling 10, the inside wall of which is threaded for mating, threadable engagement with the externally threaded terminal ends of pipes 11, 12. The upper and lower inside wall of coupling 10 is provided with identical lateral, circumferential grooves $13_1$, $13_2$ within each of which is seated rings $14_1$, $14_2$ of identical size and shape depicted in FIG. 2 generically by the reference numeral 14 since both rings $14_1$, $14_2$ are identical.

The inside wall of the internally threaded coupling 10, within which the grooves $13_1$, $13_2$ are cut, it will be observed, is tapered inwardly from a terminal end, the inside diameter of the coupling 10 being larger at the ends than at the center of the coupling. The taper aids in retaining in place, and sealing a ring 14 within its respective groove 13 when a pipe is made up with the coupling.

Figure 3:
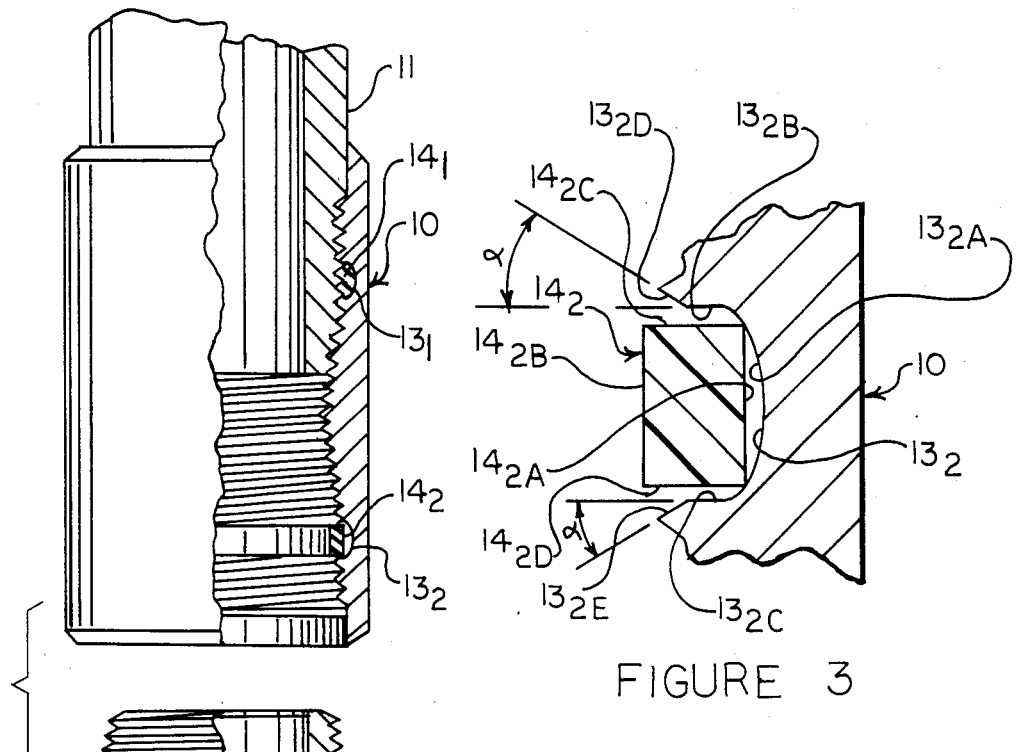
FIG. 3 depicts, in fragmentary section, an enlargement of a seal cross-section of the coupling, inclusive of a groove component and seal ring component, in which the coupling and pipe section has not been made up.

An enlargement of a cross-section of groove $13_2$, with its ring $14_2$, located at the lower end of the coupling 10 is described by reference to FIG. 3. The "bottom" $13_{2A}$ of the groove $13_2$, or right side wall as shown in this figure, is cut below the thread depth and contoured or rounded. The contoured outer edges of the groove $13_2$ are adjointed via its straight sides $13_{2B}$, $13_{2C}$ to the inclined wall edges $13_{2D}$, $13_{2E}$ cut within the threads. The ring $14_2$, prior to make up between the pipe 12 and coupling 10, is undeformed and rests with only the outer edges of its "lower" or inner face $14_{2A}$ contacting the wall surface $13_{2A}$ forming the groove $13_2$. The outer face $14_{2B}$ of the ring $14_2$ extends slightly above, or beyond the peaks of the threads. The width of the ring 14 is slightly less than that of the groove $13_2$, such that the side, straight outer faces $14_{2C}$, $14_{2D}$ of the ring $14_2$ lie parallel with the wall surfaces $13_{2B}$, $13_{2C}$ of the circumferential groove $13_2$.

The seal represented by the enlargement of a cross-section of groove $13_1$, with its ring $14_1$, located at the upper end of coupling 10 is identical in all respects to that described by reference to FIG. 3 except that in this instance the ring $14_1$ is deformed by make-up of pipe 11 with the coupling 10. In this instance, the peaks of the external threads of the pipe 11 are rotated through the seal ring $14_1$ this deforming, and causing extrusion of the seal ring $14_1$ into the contoured, or rounded bottom $13_{1A}$ of the groove $13_1$. The seal $14_1$, so deformed, not only fills the volume of the contoured, rounded bottom $13_{1A}$ but now also presses against the straight walls $13_{1B}$, $13_{1C}$, and the angled bevelled edges $13_{1D}$, $13_{1E}$ which adjoin the walls $13_{1B}$, $13_{1C}$. In other words, the deformed seal $14_1$ is extruded into the previously unoccupied volume formed by the circumferential contoured, rounded bottom $13_{1A}$ of groove $13_1$, and that left between the undeformed seal ring $14_1$ and walls $13_{1B}$, $13_{1D}$, $13_{1C}$, $13_{1E}$. By virtue of the space provided by the contoured bottoms $13_{1A}$, $13_{2A}$, and that provided by the angled wall surfaces $13_{1D}$, $13_{1E}$ and $13_{2D}$, $13_{2E}$ of circumferential grooves $13_1$, $13_2$, the pressure, or stress, normally exerted against the wall of the coupling 10 is greatly reduced, and corrosion is lessened.

In forming a circumferential groove 13, the bottom surface thereof ($13_{1A}$, $13_{2A}$) is contoured to provide a space, or volume which will accommodate sufficient of the distorted seal ring 14 to lessen the pressure which would normally be exerted against the wall. In general, particularly with pipe or collar diameters ranging from about 0.5 inch to about 5 inches inside diameter, the radius of the contour defined at the bottom surface of the groove ($13_{1A}$, $13_{2A}$) ranges from about 1/16 inch to about 5/16 inch, preferably from about ⅛ inch to about ¼ inch, with the width of the groove ranging from about 0.10 inch to about 0.75 inch, preferably from about 0.25 inch to about 0.50 inch. The angle Alpha of the wall surfaces $13_{1D}$, $13_{1E}$ and $13_{2D}$, $13_{2E}$ ranges from about 20° to about 45°, preferably from about 25° to about 35°. Grooves 13 of 0.188 width provided with contoured bottoms of 3/16" radius, adjoining or intersecting straight side walls of 0.029 inch length, and an angle Alpha of 30° cut into the threads have been found to seal with Teflon rings quite effectively, to produce very little pressure against the walls of the coupling adjacent the seals. Consequently there are minimal stressrisers, and very little corrosion on the outside walls of the coupling adjacent the seals. This is sharply contrasted with the effects found in a coupling wherein the grooves accommodating the Teflon rings were 0.188 inch wide, straight sided and flat bottomed. The grooves in this instance, plunge cut into the thread a rough finish with stressrisers and rough burrs, created excessive pressure on the Teflon rings after make-up, and the effects of corrosion were all too soon observed on the outside walls of the coupling. The radius at the bottom of the groove in accordance with the present invention thus clearly eliminates the stressriser condition and diverts the extrudable ring to form a controlled compact seal that causes a minimum of coupling swell and sandwich effect between adjacent mating threads.

Figures 5, 6:
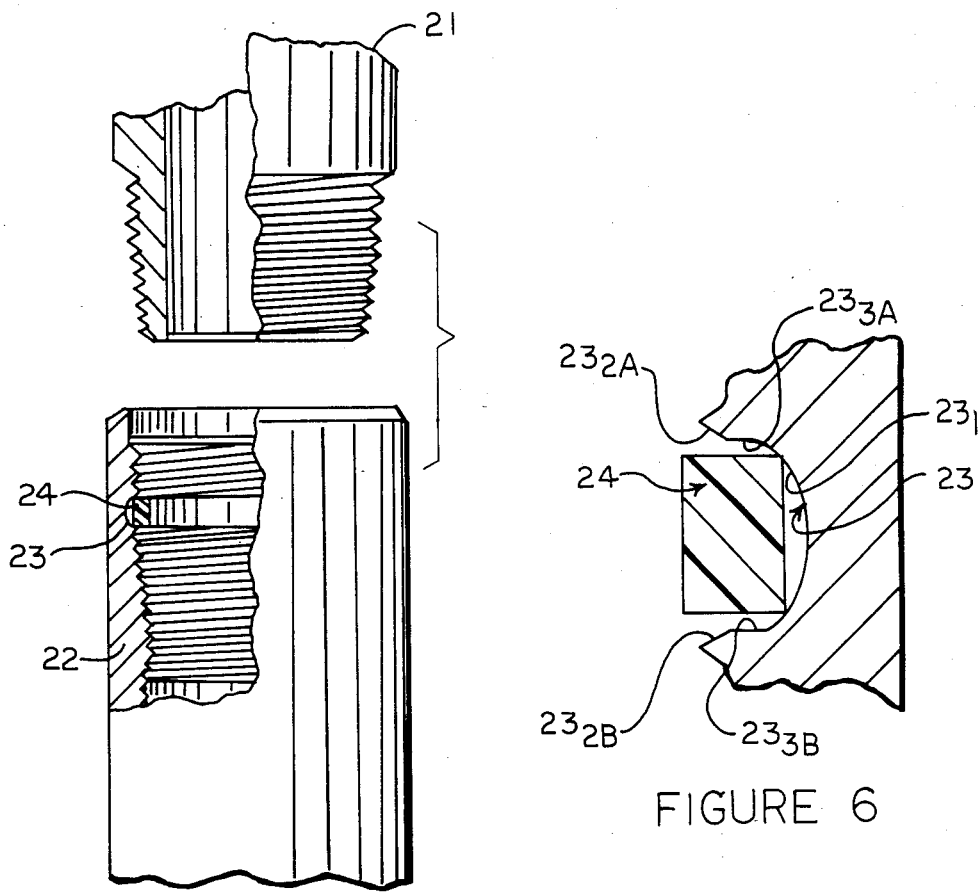
FIG. 5 depicts in fragmentary cross section a joint utilizing the seals of this invention, the seal including a groove component and seal ring component.
FIG. 6 depicts, in fragmentary section, an enlargement of the seal cross-section within the lower joint, the joints of which have not been made up.

Referring now to FIG. 5 there is depicted a joint constituted of sections of pipe 21, 22 provided with a seal, inclusive of a grooved component and ring component, identical to that described by reference to FIGS. 1 through 4. Thus, referring particularly to FIG. 6, the seal provided in the pipe 22 is constituted of a circumferential groove 23, the bottom surface $23_1$ of which is rounded or contoured, with angled walls $23_{2A}$, $23_{2B}$ that intersect straight sections $23_{3A}$, $23_{3B}$ which in turn intersect the rounded or contoured surface $23_1$ which forms said groove.

It is apparent that various modifications can be made without departing the spirit and scope of the invention. Changes in size, shape, or in the absolute and relative dimensions of the parts, materials used and the like can be made, as will be apparent to those skilled in this art.

The sealing ring is necessarily constructed of a non-rigid extrudable elastomeric material, or material which, when the coupling or joint is made up will deform, and extrude into the contoured surface and angled cut-out areas as the make up threads of the pipe passes thereover. Exemplary of such non-rigid, extrudable materials are such elastomers as the self lubricated plastics, polymers, and copolymers, e.g. Nylon, Dacron, and Teflon (polytetrafluoroethylene). These materials can be used as solid rings, or as the outer surface of laminar constructions which form such rings.

Having described the invention what is claimed is:

1. In couplings, and joints, as used in the formation of production tubing for use in sour gas containing hydrogen sulfide environments, where a tubular member containing an inwardly tapered threaded section is provided with a seal inclusive of an annular groove and ring-shaped extrudable generally non-resilient sealing member seated in said groove, said ring-member being extrudable into and confinable within said groove when said couplings, or joints, are made up by threadably connecting therewith a threaded end of pipe, and make-up of said couplings, or joints, produces hoop stresses in the outer walls of said couplings, or joints, adjacent said non-resilient sealing member against which force is applied during make-up.

the improvement wherein, the bottom face of said annular groove component of said seal is contoured to provide a radius ranging from about ⅛ inch to about ¼ inch, the annular groove is provided with side walls, the side walls of the annular groove are straight and are adjoined to angular sides ranging from about 20° to about 45°, such that the ring-shaped extrudable generally resilient sealing member is extruded into said contour within the bottom face of said annular groove component, and space provided by the angular sides of said annular groove component to reduce hoop stresses within the outer walls of said couplings, or joints, opposite said grooves.

2. The apparatus of claim 1 wherein the bottom face of said annular groove has a radius ranging from about 1/16 inch to about 5/16 inch.

3. The apparatus of claim 1 wherein the angular sides range from about 25° to about 35°.

4. The apparatus of claim 1 wherein the width of the annular groove ranges from about 0.1 inch to about 0.75 inches.

5. The apparatus of claim 4 wherein the width of the annular groove ranges from about 0.25 inch to about 0.50 inch.

* * * * *